US012627191B2

(12) United States Patent
Koda et al.

(10) Patent No.: US 12,627,191 B2
(45) Date of Patent: May 12, 2026

(54) JOINED ASSEMBLY AND PRODUCTION METHOD THEREOF

(71) Applicant: DENSO CORPORATION, Kariya-city (JP)

(72) Inventors: Kazuki Koda, Kariya-city (JP); Hideaki Shirai, Kariya-city (JP); Tsuguya Shimosakamoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 189 days.

(21) Appl. No.: 18/405,533

(22) Filed: Jan. 5, 2024

(65) Prior Publication Data

US 2024/0146139 A1     May 2, 2024

Related U.S. Application Data

(63) Continuation of application No. PCT/JP2022/024165, filed on Jun. 16, 2022.

(30) Foreign Application Priority Data

Jul. 9, 2021     (JP) ................................. 2021-114458

(51) Int. Cl.
*H02K 3/47* (2006.01)
*H02K 15/061* (2025.01)

(52) U.S. Cl.
CPC .............. *H02K 3/47* (2013.01); *H02K 15/061* (2013.01)

(58) Field of Classification Search
CPC . H01F 5/06; H02K 3/47; H02K 3/522; H02K 15/12; H02K 3/42; H02K 3/04;
(Continued)

(56) References Cited

U.S. PATENT DOCUMENTS

| | | | | |
|---|---|---|---|---|
| 2013/0127289 A1* | 5/2013 | Koga | ........................ | H01F 5/00 |
| | | | | 174/113 R |
| 2014/0202729 A1* | 7/2014 | Tanaka | ..................... | H01R 4/14 |
| | | | | 174/103 |
| 2020/0162003 A1 | 5/2020 | Takahashi et al. | | |

FOREIGN PATENT DOCUMENTS

| | | | |
|---|---|---|---|
| JP | H04124712 U | * | 11/1992 |
| JP | 2019-106865 A | | 6/2019 |

(Continued)

OTHER PUBLICATIONS

JP-2020027726-A machine translation Sep. 5, 2025.*
JP-H04124712-U machine translation Sep. 5, 2025.*
Traditional Challenge: Third-Party Structure Benchmarking.

*Primary Examiner* — Leda T Pham

(74) *Attorney, Agent, or Firm* — Harness, Dickey & Pierce, P.L.C.

(57) ABSTRACT

A joined assembly comprises a wire bundle and a metallic member joined to the wire bundle. The wire bundle includes a bundle of a plurality of conductive wires which are isolated from each other using inter-wire insulating layers and adhered to each other, the inter-wire insulating layers being made from insulating resin. The wire bundle includes a head portion and a head extension. The head portion is arranged on a first side of the wire bundle in a lengthwise direction (Da) thereof. The head extension extends from the head portion to a second side of the wire bundle away from the first side in the lengthwise direction. The metallic member includes a metallic member connecting portion arranged in contact with the head extension. The conductive wires are kept adhered to each other through the inter-wire insulating layers in the head extension and fusion-joined in the head portion to a portion of the metallic member connecting portion. The head portion of the wire bundle has the inter-wire insulating layers removed therefrom.

6 Claims, 9 Drawing Sheets

70

71     71     71

(58) Field of Classification Search
CPC .. H02K 15/095; H02K 5/225; H02K 15/0431;
H02K 3/38; H02K 15/105
See application file for complete search history.

(56) References Cited

FOREIGN PATENT DOCUMENTS

JP        2020-028170  A       2/2020
JP        2020027726  A   *   2/2020

* cited by examiner

FIRST SIDE

Da

SECOND SIDE

FIRST SIDE

Da

SECOND SIDE

70

71        71        71

12

123

13        13

13

14

16        13

13    13    13

| | |
|---|---|
| PREPARATION STEP | S01 |
| REMOVE OUTER COAT LAYER | S02 |
| HOLDING STEP | S03 |
| FUSION JOINING STEP | S04 |

FIRST SIDE

Da

SECOND SIDE

JOINED ASSEMBLY AND PRODUCTION METHOD THEREOF

CROSS REFERENCE TO RELATED DOCUMENT

The present application is a continuation of Application No. PCT/JP2022/024165, filed Jun. 16, 2022, which claims the benefit of priority of Japanese Patent Application No. 2021-114458 filed on Jul. 9, 2021. The entire disclosures of each of the above applications are incorporated herein by reference.

TECHNICAL FIELD

This disclosure relates generally to a joined assembly of a bundle of wires and a metallic member and production method thereof.

BACKGROUND OF ART

Patent literature 1 teaches a joining method to join a wire bundle including conductive wires covered with insulating resin layers to a metallic terminal. Specifically, the joining method includes a first step of pressing the metallic terminal and a joint of the wire bundle to the metallic terminal to firmly adhere the metallic terminal and the joint of the conductive wires to each other and a second step of supplying an electrical current to the metallic terminal with the metallic terminal and the joint of the wire bundle being kept pressed together. This generates thermal energy to plastically deform the conductive wires at the joint and discharge melted insulating resin from the joint.

PRIOR ART DOCUMENT

Patent Literature

PATENT LITERATURE 1: Japanese Patent First Publication No. 2020-27726

SUMMARY OF THE INVENTION

A joined assembly which includes a wire bundle (equivalent to the wire bundle taught in Patent literature 1) and a metallic member (equivalent to the metallic terminal taught in Patent literature 1) may be produced in a way other than that discussed above. For instance, there may be proposed a joint assembly in which a joint between the wire bundle and the metallic member contains fused materials of the wire bundle and the metallic member. In a production process of such a type of a joined assembly including a wire bundle of a plurality of conductive wires electrically isolated from each other through inter-wire insulating layers, a portion of the wire bundle which is required to be fusion-joined is, in some cases, first loosened to remove the inter-wire insulating layer partially therefrom.

We have studied and found that the loosening of the bundle of the conductive wires will be a factor resulting in reduction in productivity of the joined assembly.

This disclosure was made in view of the above problem. It is an object to provide a joined assembly designed to avoid a reduction in productivity in a production process thereof and to provide a production method of such a joined assembly.

According to one aspect of this disclosure in order to achieve the above object, there is provided a joined assembly which comprises: (a) a wire bundle; and (b) a metallic member joined to the wire bundle. The wire bundle includes a bundle of a plurality of conductive wires which are isolated from each other using inter-wire insulating layers and adhered to each other. The inter-wire insulating layers are made from insulating resin. The wire bundle includes a head portion and a head extension. The head portion is arranged on a first side of the wire bundle in a lengthwise direction thereof. The head extension extends from the head portion to a second side of the wire bundle away from the first side in the lengthwise direction. The metallic member includes a metallic member connecting portion arranged in contact with the head extension. The conductive wires are kept adhered to each other through the inter-wire insulating layers in the head extension and fusion-joined in the head portion to a portion of the metallic member connecting portion. The head portion of the wire bundle has the inter-wire insulating layers removed therefrom.

The above structure facilitates removal of the inter-wire insulating layers using thermal energy generated by fusion-joining the head portion of the wire bundle to the metallic member connecting portion and also enables each of the conductive wires arranged within the head portion to be fusion-joined to the metallic member connecting portion without need for loosening the bundle of the conductive wires in a production process of the joined assembly. This avoids the reduction in productivity of the joined assembly.

According to another aspect of this disclosure, there is provided a production method for a joined assembly including a wire bundle and a metallic member, which comprises: (a) using a bundle of a plurality of conductive wires as the wire bundle, the conductive wires being isolated from each other through inter-wire insulating layers made from insulating resin; (b) holding a head portion of the wire bundle in contact with a metallic member connecting portion of the metallic member, the head portion being arranged on a first side of the wire bundle in a lengthwise direction of the wire bundle, the head extension extending from the head portion to a second side of the wire bundle away from the first side in the lengthwise direction, the conductive wires being kept adhered to each other through the inter-wire insulating layer within the head extension, and (c) making an end-to-end joint which is created by fusion-joining the conductive wires within the head portion of the wire bundle to a portion of the metallic member connecting portion after the head extension is retained to the metallic member connecting portion. The end-to-end joint is created by emitting an energy beam to fuse and weld the head portion of the wire bundle to the portion of the metallic member connecting portion and also to remove the inter-wire insulating layers from the head portion.

The above production method, like the above first aspect of this disclosure, facilitates removal of the inter-wire insulating layers using thermal energy generated by fusion-joining the head portion of the wire bundle to the metallic member connecting portion and also enables each of the conductive wires arranged within the head portion to be fusion-joined to the metallic member connecting portion without need for loosening the bundle of the conductive wires in a production process of the joined assembly. This avoids the reduction in productivity of the joined assembly.

In this disclosure, reference numbers or symbols in brackets represent correspondence relations to elements discussed in embodiments, as described below.

EMBODIMENT FOR CARRYING OUT THE INVENTION

Embodiments will be described below with reference to the drawings. In the following discussion of the embodiments, the same or similar reference numbers or symbols will refer to the same or similar parts, and explanation thereof in detail will be omitted here.

First Embodiment

Figure 1:
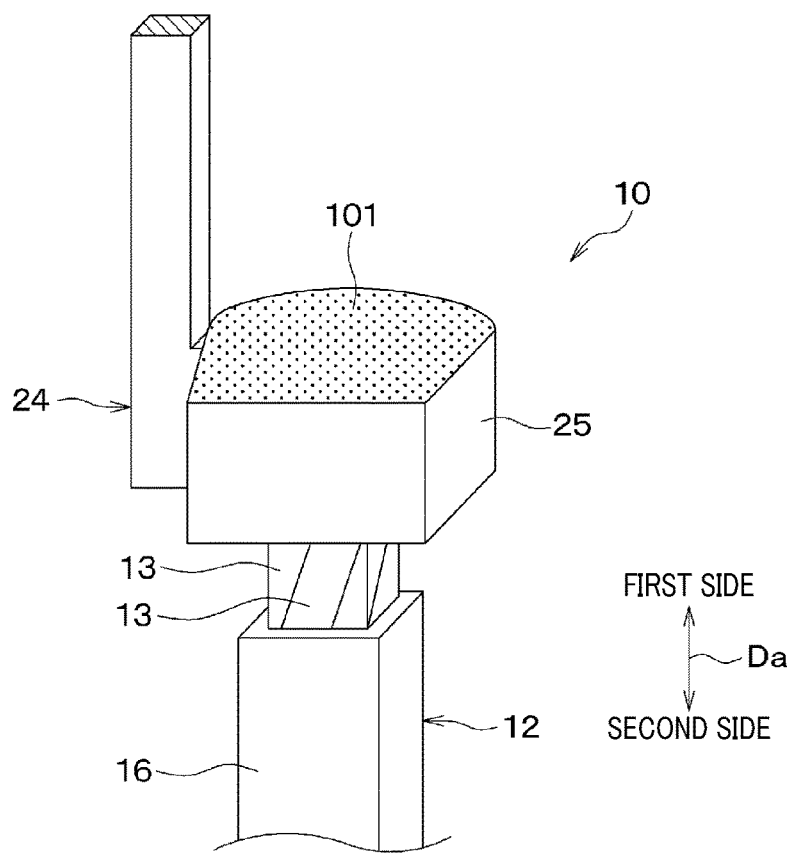
FIG. 1 is a perspective view which schematically illustrates a joined assembly according to the first embodiment.
Figure 2:
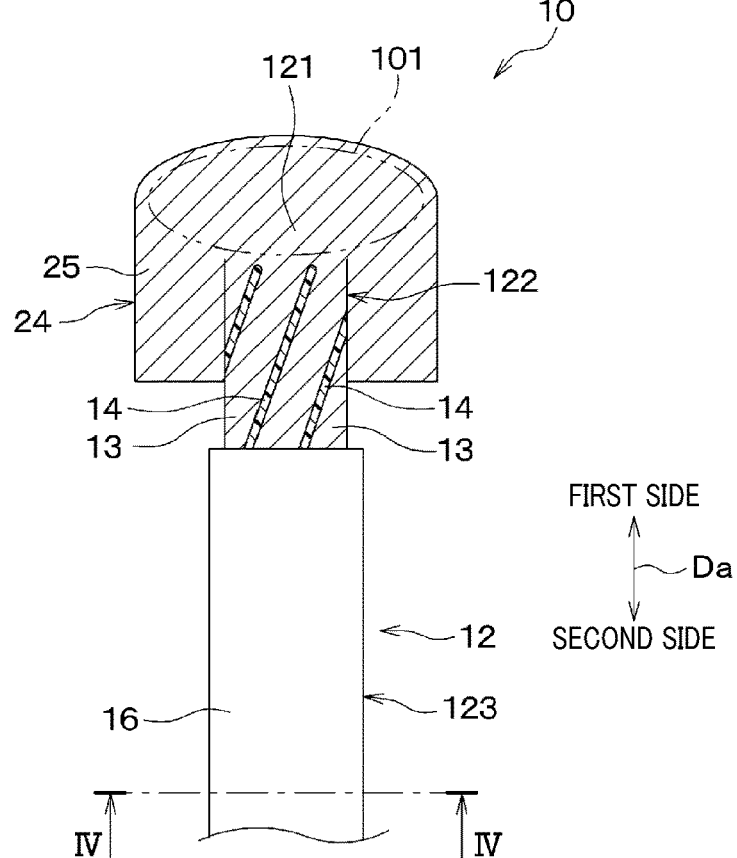
FIG. 2 is a sectional view which schematically illustrates a joined assembly from which a covering of a twisted-wire conductor is removed in the first embodiment.

The joined assembly 10 in this embodiment is, as illustrated in FIGS. 1 and 2, an assembly of the twisted-wire conductor 12 and the metallic member 24 which are joined together. For instance, the joined assembly 10 is used in the electrical motor 70 shown in FIG. 3. The electrical motor 70 includes a stator made up of a plurality of electromagnetic coils 71 each of which includes the joined assembly 10.

The joined assembly 10, as clearly illustrated in FIGS. 1 and 2, includes the twisted-wire conductor 12 and the metallic member 24. The twisted-wire conductor 12 is wound several times to complete each of the electromagnetic coils 71 shown in FIG. 3. The twisted-wire conductor 12, as shown in FIGS. 2 and 4, includes a plurality of conductive wires 13, the inter-wire insulating layers 14 (which will also be referred to as first insulating layers), and the outer insulating layer 16 (which will also be referred to as a second insulating layer). The twisted-wire conductor 12 is made of a bundle of a plurality of conductive wires 13 (which will also be referred to as a wire bundle).

The twisted-wire conductor 12 includes seven conductive wires 13 which are made from copper or copper alloy. Specifically, the conductive wires 13 are twisted in the twisted-wire conductor 12 without extending parallel to each other in the lengthwise direction Da. When the twisted-wire conductor 12 is curved without extending straight, the lengthwise direction Da of the twisted-wire conductor 12 is defined as a direction oriented along the curve of the twisted-wire conductor 12.

Each of the inter-wire insulating layers 14 is made of an electrically insulating layer disposed between an adjacent two of the conductive wires 13 to electrically isolate the conductive wires 13 from each other. Each of the inter-wire insulating layers 14 serves to electrically insulate the conductive wires 13 from each other and also adhere the conductive wires 13 to each other. The inter-wire insulating layers 14 have an average thickness of 3 μm to 30 μm. Each of the inter-wire insulating layers 14 is made from, for example, amide-imide (AI) resin which will also be referred to below as a first insulating resin.

The outer insulating layer 16 is an electrically insulating layer disposed outside the conductive wires 13 and the inter-wire insulating layers 14 to cover the conductive wires 13 and the inter-wire insulating layers 14. In other words, the outer insulating layer 16 is of a hollow cylindrical shape and extends in the lengthwise direction Da of the twisted-wire conductor 12. The outer insulating layer 16 is shaped to have the conductive wires 13 and the inter-wire insulating layers 14 arranged therein. The outer insulating layer 16 has an average thickness 40 μm to 80 μm which is greater than that of each of the inter-wire insulating layers 14. The outer insulating layer 16 may be made from, for example, polyetheretherketone (PEEK) resin.

The twisted-wire conductor 12 also includes the head portion 121, the head extension 122, and the covering 123. Each of the head portion 121, the head extension 122, and the covering 123 is defined by a portion of a length of the twisted-wire conductor 12 extending in the lengthwise direction Da. The head portion 121 occupies a portion of the twisted-wire conductor 12 which is located on the first side of the length of the twisted-wire conductor 12 in the lengthwise direction Da. The head extension 122 is arranged closer to the second side of the length of the twisted-wire conductor 12 than the head portion 121 is. The second side, as referred to herein, is away from the first side in the lengthwise direction Da. The head extension 122 extends directly from the head portion 121. The covering 123 is located closer to the second side of the twisted-wire conductor 12 than the head extension 122 is in the lengthwise direction Da and extends directly from the head extension 122. In this disclosure, the lengthwise direction of the twisted-wire conductor 12 will also be referred to as the twisted-wire lengthwise direction Da.

The outer insulating layer 16 of the twisted-wire conductor 12 occupies an overall length of the twisted-wire conductor 12, so that it occupies the covering 123. Specifically, the outer insulating layer 16 has a portion which occupies the covering 123 and entirely covers the conductive wires 13 and the inter-wire insulating layers 14. The outer insulating layer 16 occupies the head portion 121 nor the head extension 122. In other words, the outer insulating layer 16 is shaped to cover the conductive wires 13 and the inter-wire insulating layers 14 completely on the second side of the twisted-wire conductor 12 which is away from the head extension 122 in the twisted-wire lengthwise direction Da.

Referring back to FIGS. 1 and 2, the metallic member 24 is made from, for example, copper or copper alloy and joined to the twisted-wire conductor 12 to supply electricity to the twisted-wire conductor 12. The metallic member 24 serves as a busbar.

The metallic member 24 includes the metallic member connecting portion 25 which is placed in contact with the head extension 122 of the twisted-wire conductor 12. For instance, the metallic member connecting portion 25 is shaped to tightly hold the head extension 122 therein to make electrical contact with the head extension 122. The conductive wires 13 of the twisted-wire conductor 12 are twisted to form the head extension 122 and adhered to each other by the inter-wire insulating layers 14. The conductive wires 13 which define the head portion 121 of the twisted-wire conductor 12 are fused and joined to a portion of the metallic member connecting portion 25. The joined assembly 10, therefore, includes the re-solidified portion 101 produced by a portion of the joined assembly 10 which has been melted and then solidified. The re-solidified portion 101 includes a portion of the metallic member connecting portion 25 and the head portion 121 of the twisted-wire conductor 12, in other words, it at least partially extends over the twisted-wire conductor 12 and the metallic member 24.

Specifically, the conductive wires 13 of the twisted-wire conductor 12 are, like the covering 123, twisted to form the head extension 122. The conductive wires 13 of the twisted-wire conductor 12 have portions which define the head portion 121 and are fused and joined to a portion of the metallic member connecting portion 25 which is located on the first side in the twisted-wire lengthwise direction Da.

The head portion 121 of the twisted-wire conductor 12 is fused and joined to the metallic member connecting portion 25, so that the shape of the conductive wires 13 of the head portion 121 will be different from that before the head portion 121 is fused and joined to the metallic member connecting portion 25. In FIG. 1, the re-solidified portion 101 is indicated by dot-hatching.

The production method of the joined assembly 10 will be described below with reference to FIG. 5. In the first step S01 that is a preparation step, the twisted-wire conductor 12 and the metallic member 24 which are discrete from each other are prepared. The routine then proceeds to the second step S02.

Figure 6:
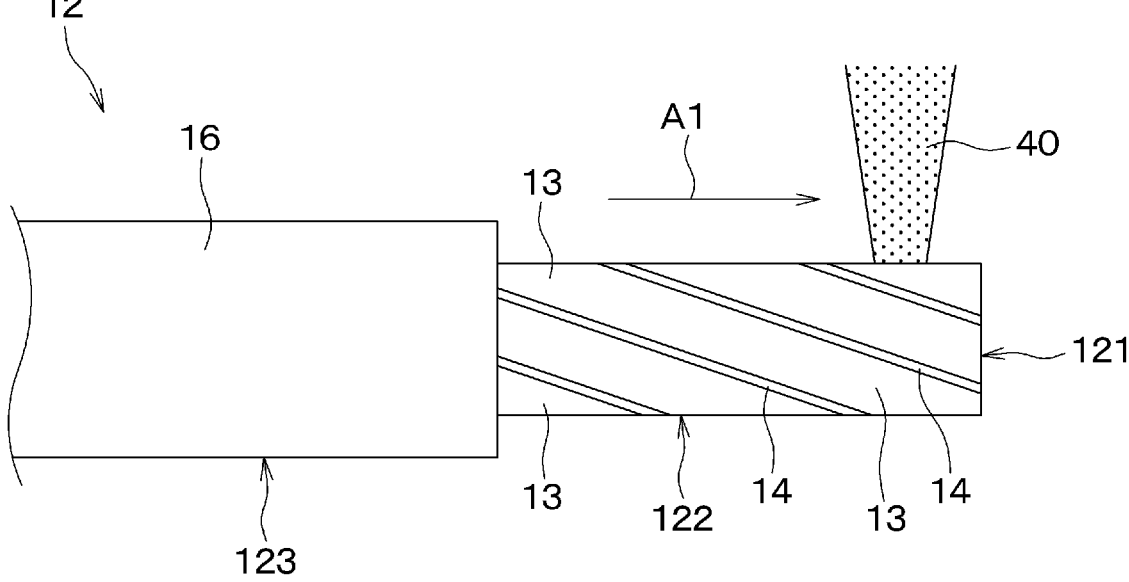
FIG. 6 is a view which schematically illustrates removal of an outer insulating layer from a head portion and a head extension of a twisted-wire conductor in a second step in FIG. 5.

In the second step S02 that is an outer coat layer removal step, the outer insulating layer 16 is, as illustrated in FIG. 6, partially removed from a portion of the twisted-wire conductor 12 to expose the head portion 121 and the head extension 122. For instance, the laser beam 40 is emitted onto the head portion 121 and the head extension 122 and swung in the way indicated by an arrow A1 in the twisted-wire lengthwise direction Da to remove a portion of the outer insulating layer 16 from the twisted-wire conductor 12 to expose the head portion 121 and the head extension 122. The laser beam 40 may be, for example, an infrared pulsed laser beam. After completion of the second step, the routine proceeds to the third step S03.

Figure 7:
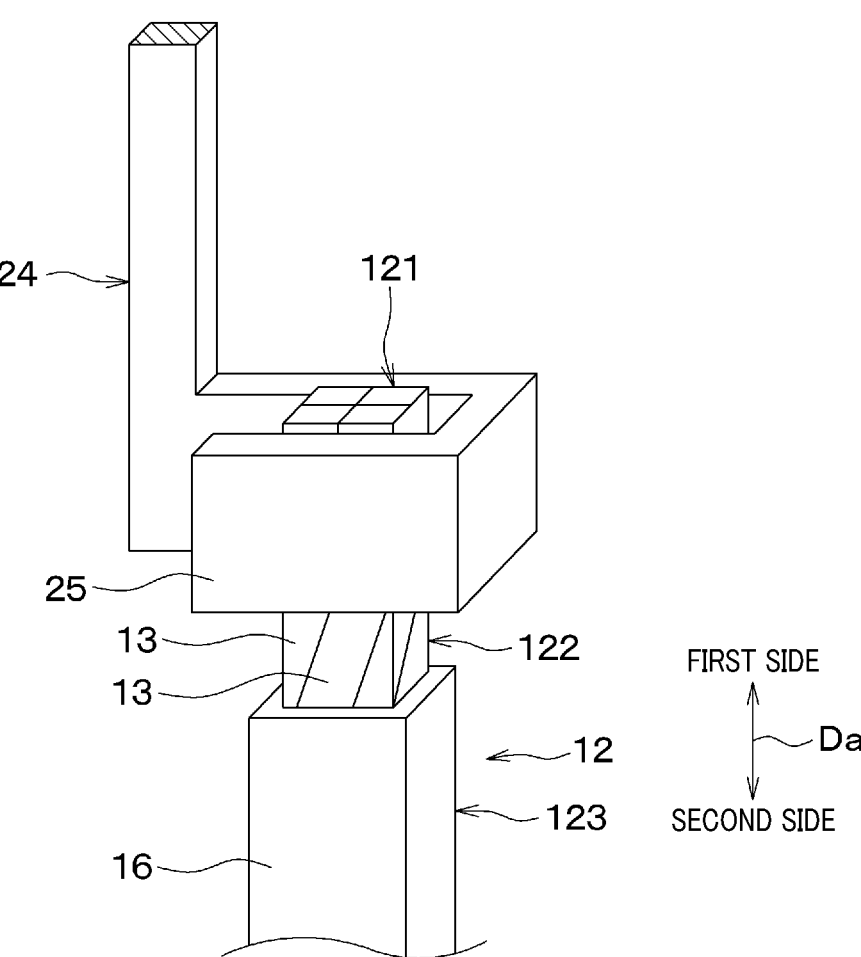
FIG. 7 is a perspective view which schematically illustrates a twisted-wire conductor retained by a metallic member in a third step in FIG. 5.

In the third step S03 that is a holding step, the head portion 121 and the head extension 122 of the twisted-wire conductor 12 are, as demonstrated in FIG. 7, firmly held by the metallic member connecting portion 25 from moving relative to the metallic member 24. For convenience sake, FIGS. 1 and 7 omit the inter-wire insulating layers 14 of the twisted-wire conductor 12.

Specifically, the metallic member connecting portion 25 prepared in the first step S01 is of a U-shape. In the third step S03, the head portion 121 and the head extension 122 of the twisted-wire conductor 12 are inserted into the U-shaped metallic member connecting portion 25. The metallic member connecting portion 25 is then mechanically pressed so that it is deformed to grip the head portion 121 and the head extension 122. This causes the head portion 121 and the head extension 122 of the twisted-wire conductor 12 to be firmly retained by the metallic member connecting portion 25 in direct contact therewith.

When the twisted-wire conductor 12 is retained by the metallic member connecting portion 25 in the above way, the conductive wires 13 of the head portion 121 and the head extension 122 of the twisted-wire conductor 12 are, as illustrated in FIGS. 6 and 7, kept twisted, so that the conductive wires 13 are still adhered together by the inter-wire insulating layers 14 without the twist thereof being released. After completion of the third step S03, the routine proceeds to the fourth step S04.

Figure 8A:
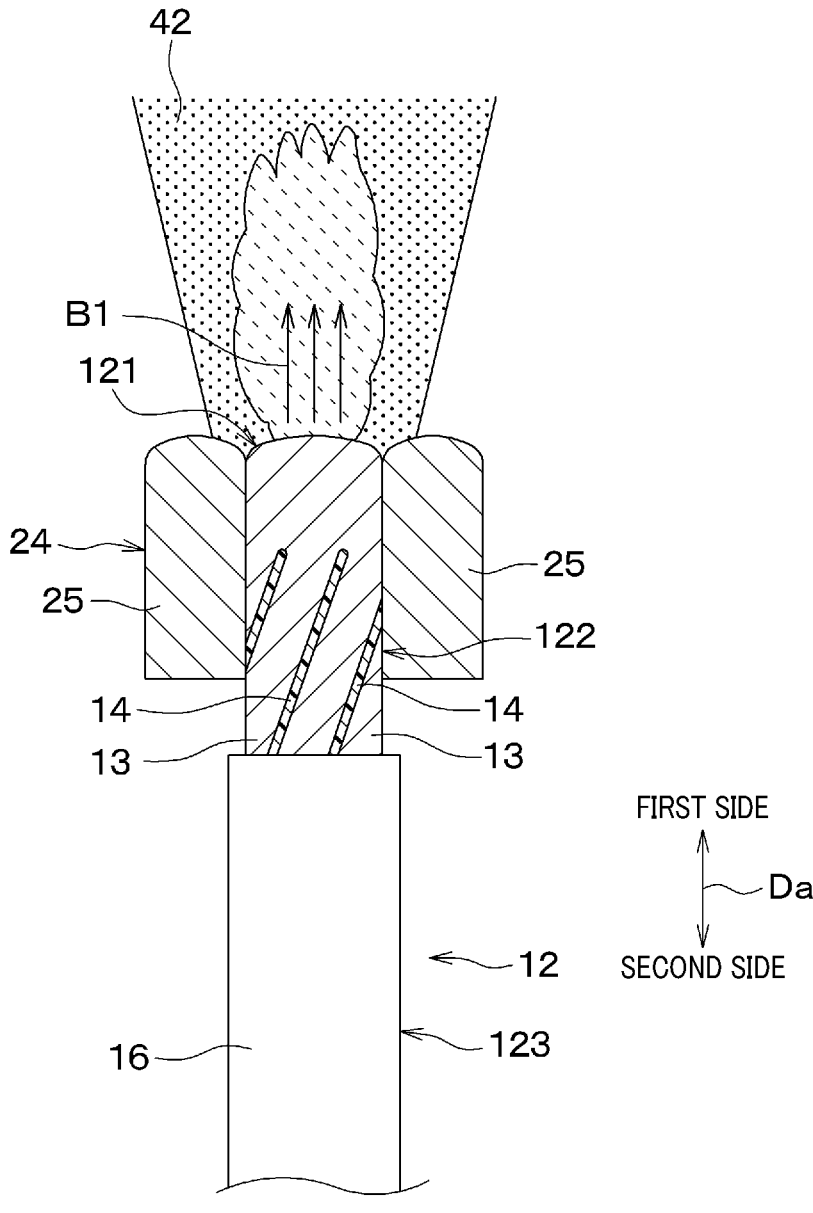
FIG. 8A is a cross sectional view which illustrates a first one of three emissions of an energy beam achieved in a fourth step in FIG. 5.
Figure 8B:
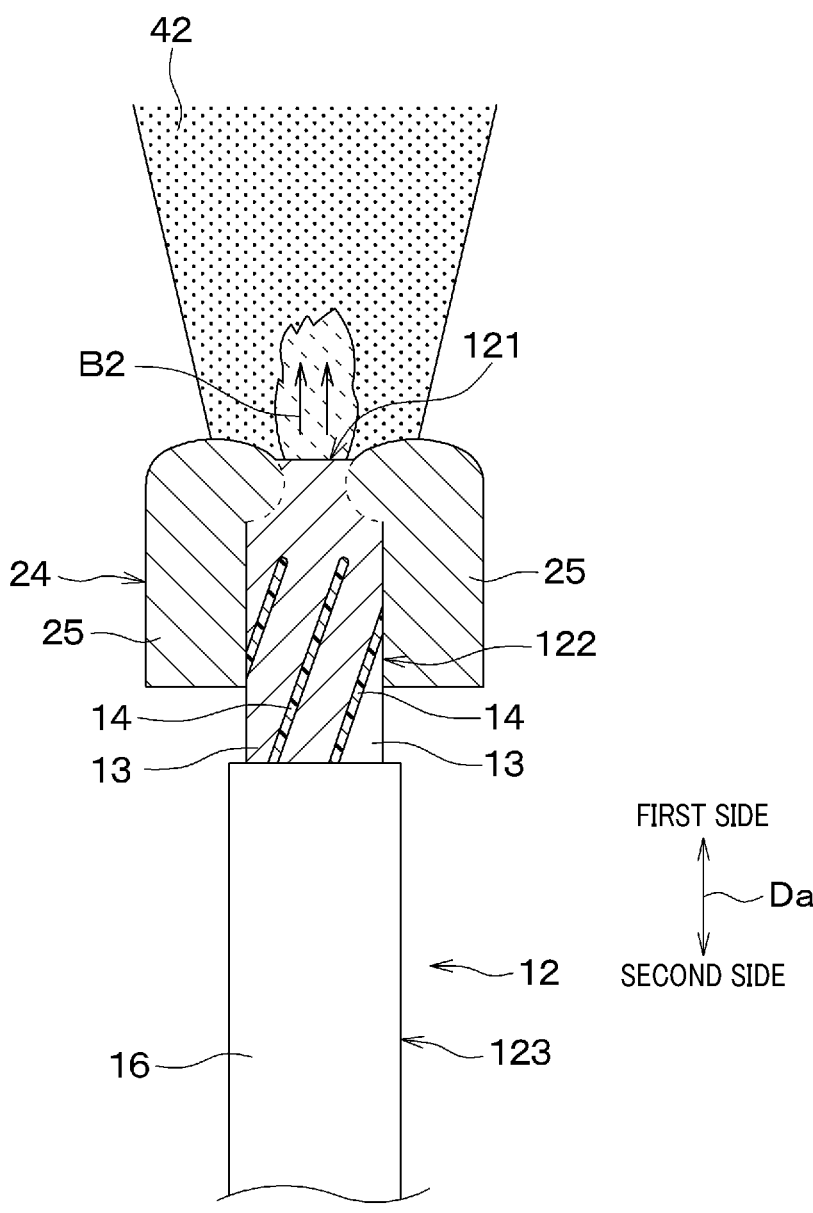
FIG. 8B is a cross sectional view which illustrates a second one of three emissions of an energy beam achieved in a fourth step in FIG. 5.
Figure 8C:
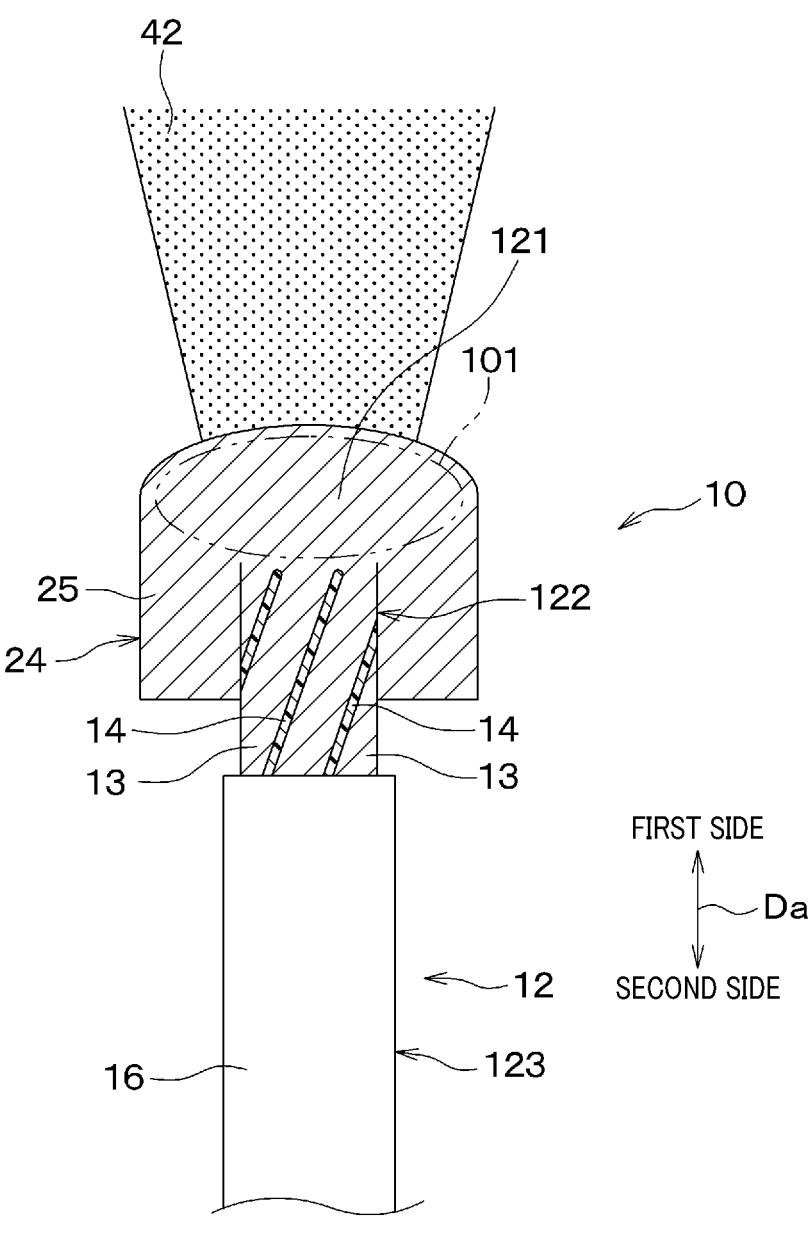
FIG. 8C is a cross sectional view which illustrates a third one of three emissions of an energy beam achieved in a fourth step in FIG. 5.

In the fourth step S04 that is a fusion joining step, the conductive wires 13 of the head portion 121 of the twisted-wire conductor 12 and a portion of the metallic member connecting portion 25 are, as illustrated in FIGS. 8A to 8C, fused and adhered together by the energy beam 42. Specifically, the energy beam 42 is emitted several times onto and around the head portion 121 of the twisted-wire conductor 12 from the first side defined outside the head portion 121 in the twisted-wire lengthwise direction Da. This causes the head portion 121 of the twisted-wire conductor 12 and the portion of the metallic member connecting portion 25 to be melted and joined together and also causes the inter-wire insulating layers 14 to be removed or disappear from the head portion 121.

As the energy beam 42, a laser beam having a wavelength of 400 to 600 nm, such as a green laser beam or blue laser beam, is used. The energy beam 42 may be emitted onto the head portion 121 of the twisted-wire conductor 12 while being moved on the head portion 121 depending upon the size of an area of the head portion 121 which are required to be melted. The energy beam 42 may alternatively be emitted onto a fixed portion of the head portion 121 without being moved or swung. For convenience's sake, FIGS. 8A to 8C, like FIG. 2, illustrate a sectional area of the twisted-wire conductor 12 except the covering 123.

The emission of the energy beam 42 to the head portion 121 is achieved three times at a given time interval. Specifically, the first emission of the energy beam 42, as demonstrated in FIG. 8A, causes the head portion 121 of the twisted-wire conductor 12 and a portion of the metallic member connecting portion 25 which is located on the first side in the twisted-wire lengthwise direction Da to be fused and then solidified again after the emission of the energy beam 42 is completed. The fused portion of the metallic member connecting portion 25 and the fused head portion 121 are solidified separately without being mixed with each other. The inter-wire insulating layers 14 in the head portion 121 of the twisted-wire conductor 12 are evaporated or burned, as indicated by arrows 81, so that they are removed. In FIGS. 8A and 8B, the inter-wire insulating layers 14 which disappear from the head portion 121 are indicated by dot-hatching.

The second emission of the energy beam 42, as demonstrated in FIG. 8B, causes the re-solidified head portion 121 and the re-solidified portion of the metallic member connecting portion 25 to be fused again, so that they start to be mixed with each other, but they are not mixed completely and then re-solidified after the second emission of the energy beam 42 terminates. This cause a small amount of the remaining inter-wire insulating layers 14 remaining in the head portion 121 of the twisted-wire conductor 12 to be, as indicated by arrows B2, evaporated or burned away along with the fusion of the head portion 121. In this embodiment, the second emission of the energy beam 42 results in complete removal of the inter-wire insulating layers 14 in the head portion 121 of the twisted-wire conductor 12.

The third emission of the energy beam 42, as demonstrated in FIG. 8C, causes the head portion 121 of the twisted-wire conductor 12 and the portion of the metallic member connecting portion 25 which are re-solidified after completion of the second emission of the energy beam 42 to be fused again and then mixed entirely with each other. The head portion 121 of the twisted-wire conductor 12 and the portion of the metallic member connecting portion 25 which have been fused by the second emission of the energy beam 42 to be re-solidified completely without any seams after completion of the third emission of the energy beam 42. In this way, the joined assembly 10 illustrated in FIG. 1 is completed.

As discussed already, the twisted-wire conductor 12 is, as illustrated in FIGS. 1 and 2, includes the conductive wires 13 which are electrically isolated by the inter-wire insulating layers 14 from each other and firmly attached to each other. The conductive wires 13 present in the head portion 121 of the twisted-wire conductor 12 are fusion-joined to the portion of the metallic member connecting portion 25 with the conductive wires 13 present in the head extension 122 being adhered to each other through the inter-wire insulating layers 14.

The removal of the inter-wire insulating layers 14 is, therefore, achieved using thermal energy generated by the fusion-joining of the head portion 121 of the twisted-wire conductor 12 to the metallic member connecting portion 25 without need for releasing or loosening the bundle of the conductor wires 13 in the production process of the joined assembly 10. Additionally, each of the conductive wires 13 in the head portion 121 is fusion-joined completely to the metallic member connecting portion 25. This ensures stability in production of the joined assembly 10 without reduction in productivity due to the loosening of the conductive wires 13 in the course of the production process of the joined assembly 10.

Figure 5:
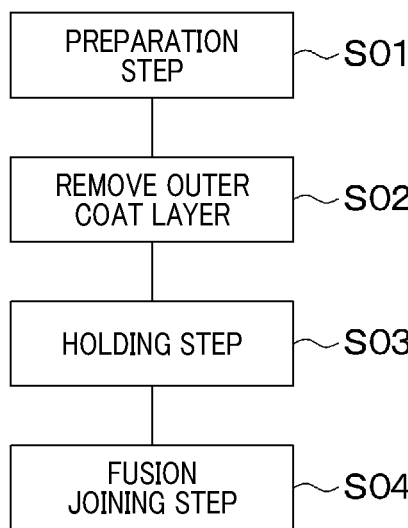
FIG. 5 is a flowchart of a production process of a joined assembly in the first embodiment.

In the third step S03 in FIG. 5, the head extension 122 of the twisted-wire conductor 12 is, as can be seen in FIG. 7, retained in contact with the metallic member connecting portion with the conductive wires 13 in the head extension 122 of the twisted-wire conductor 12 being adhered to each other using the inter-wire insulating layer 14. In the fourth step S04 in FIG. 5, an end-to-end joining is achieved, as illustrated in FIGS. 8A to 8C, by fusion-welding the conductive wires 13 in the head portion 121 of the twisted-wire conductor 12 and a portion of the metallic member connecting portion 25 together using the energy beam 42 to make an end-to-end joint. In the fourth step S04, the energy beam 42 is, as described above, emitted to fuse and weld the head portion 121 of the twisted-wire conductor 12 and the portion of the metallic member connecting portion 25. Simultaneously, the inter-wire insulating layers 14 contained inside the head portion 121 are removed.

The above structure enables each of the conductive wires 13 in the head portion 121 of the twisted-wire conductor 12 to be fusion-joined to the metallic member connecting portion 25 without having to loosen the bundle of the conductive wires 13 in the production process of the joined assembly 10. This ensures stability in production of the joined assembly 10 without reduction in productivity due to the loosening of the conductive wires 13 in the course of the production process of the joined assembly 10.

In the fourth step S04 in FIG. 5 described above, the emission of the energy beam 42 also results in removal of the inter-wire insulating layers 14 from the head portion 121 of the twisted-wire conductor 12, thereby ensuring a required area of joint of each of the conductive wires 13 with the metallic member 24 in an electrical current flow path extending from the twisted-wire conductor 12 to the metallic member 24.

Alternatively, the state of a molten pool produced by emitting the energy beam 42 to the twisted-wire conductor 12 and the metallic member connecting portion 25 may be activated while drawing the inter-wire insulating layers 14 from the molten pool. This eliminates a risk that the metallic member connecting portion 25 and the head portion 121 may be re-solidified separately into discrete parts after completion of emission of the energy beam 42.

1) This embodiment provides the outer insulating layer 16 which is, as can be seen in FIGS. 2 and 4, shaped to correct and cover the conductive wires 13 at the second side of the twisted-wire conductor 12 which is away from the head extension 122 in the twisted-wire lengthwise direction Da. The outer insulating layer 16, thus, serves to physically protect a portion of the twisted-wire conductor 12 which is away from the head extension 122 in the twisted-wire lengthwise direction Da. This eliminates the need for the inter-wire insulating layers 14 to function to physically protect the twisted-wire conductor 12, thereby enabling the inter-wire insulating layers 14 to be formed to have a thickness small enough to remove the inter-wire insulating layers 14 from the head portion 121 of the twisted-wire conductor 12 using the energy beam 42. A decrease in thickness of the inter-wire insulating layers 14 also enables a period of time consumed to fuse and joint the conductive wires 13 and the metallic member connecting portion 25 together to be shortened (e.g., the number of times the energy beam 42 is emitted may be decreased). This improves the productivity of the joined assembly 10.

2) The outer insulating layer 16 in this embodiment does not cover the head extension 122 of the twisted-wire conductor 12. This eliminates a risk that the outer insulating layer 16 may disturb the fusion-weld of the conductive wires 13 to the metallic member connecting portion 25, thereby eliminating a failure in welding them together arising from melting of the outer insulating layer 16.

3) The thickness of the inter-wire insulating layers 14 is, as described above, 3 to 30 μm on average, thereby enabling the joined assembly 10 to be made in an economical manufacturing process without sacrificing required function of the inter-wire insulating layers 14. For instance, when the average thickness of the inter-wire insulating layers 14 is less than 3 μm, it facilitates the removal of the inter-wire insulating layers 14 from the head portion 121 using the energy beam 42, but however, the smaller the thickness of the inter-wire insulating layers 14, the lower the degree of insulation between the conductive wires 13 through the inter-wire insulating layers 14. Alternatively, when the average thickness of the inter-wire insulating layers 14 is higher than 30 μm, it will result in an increased number of times the energy beam 42 is emitted, thus resulting in economical disadvantages for production of the joined assembly 10.

4) In the third step S03 in FIG. 5, the head extension 122 of the twisted-wire conductor 12 is, as illustrated in FIG. 7, retained by the metallic member connecting portion 25 in direct contact therewith with the conductive wires 13 being twisted in the head extension of the twisted-wire conductor 12. In other words, in the joined assembly 10 produced in the production process in FIG. 5, the conductive wires 13 of the twisted-wire conductor 12 are also twisted in the head extension 122. This ensures stability in production of the joined assembly 10 without reduction in productivity due to the loosening of the conductive wires 13 in the course of the production process of the joined assembly 10.

5) The metallic member 24 and the conductive wires 13 are, as described above, made from copper or copper alloy. The energy beam 42 used in the fourth step S04 in FIG. 5 is, for example, a laser beam whose wavelength is in a range of 400 to 600 nm which is suitable for melting copper or copper alloy. This ensures stability in fusing and welding the conductive wires 13 and the metallic member connecting portion 25 together without any defects unless the inter-wire insulating layers 14 has an excessive thickness and also provides a high degree of reliability of the joint between the conductive wires 13 and the metallic member connecting portion 25.

In the fourth step S04 in FIG. 5, the emission of the energy beam 42 is achieved multiple times, thereby minimizing a risk that an area of the head portion 121 of the twisted-wire conductor 12 and a portion of the metallic member connecting portion 25 which are melted by the energy beam 42 may undesirably extend and also ensuring a required degree of strength of the joint therebetween.

Second Embodiment

The second embodiment will be described below in terms of parts different from those in the first embodiment. The same parts as those in the first embodiment and equivalents thereof will be simply discussed.

In the first embodiment, the emission of the energy beam 42 is achieved several times in the fourth step S04 in FIG. 5, but however, it is achieved only one time in this embodiment. Specifically, the energy density Ed of the energy beam 42 is, as illustrated in FIG. 9, changed with time during emission of the energy beam 42.

Figure 9:
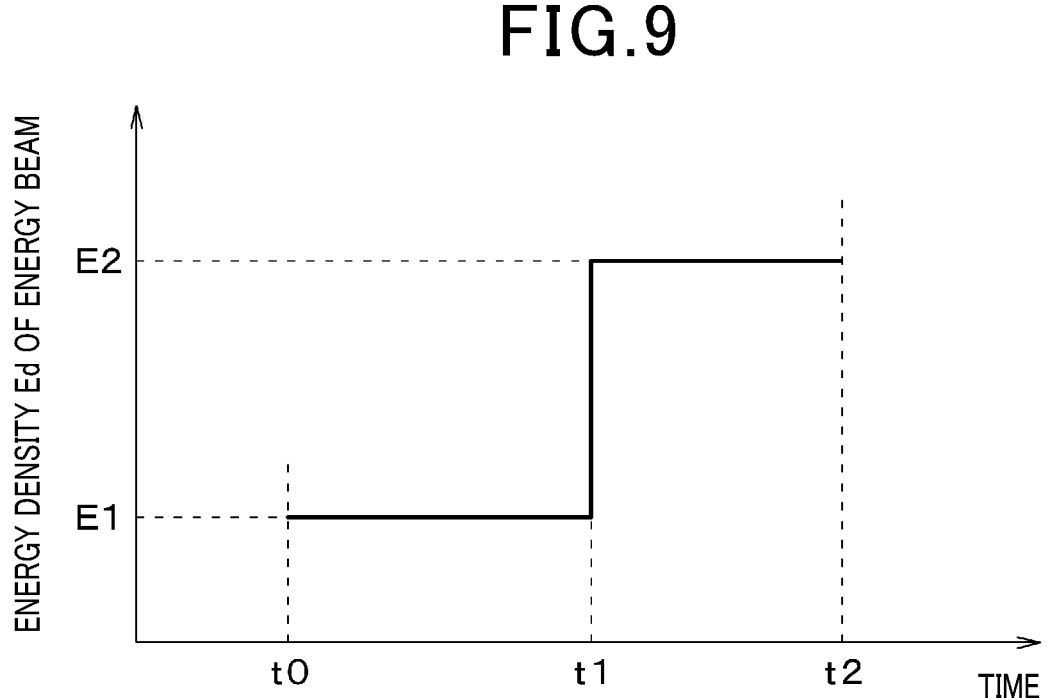
FIG. 9 is a time chart which demonstrates a change in energy density of an energy beam emitted in a fourth step in FIG. 5 in the second embodiment.
Figure 10:
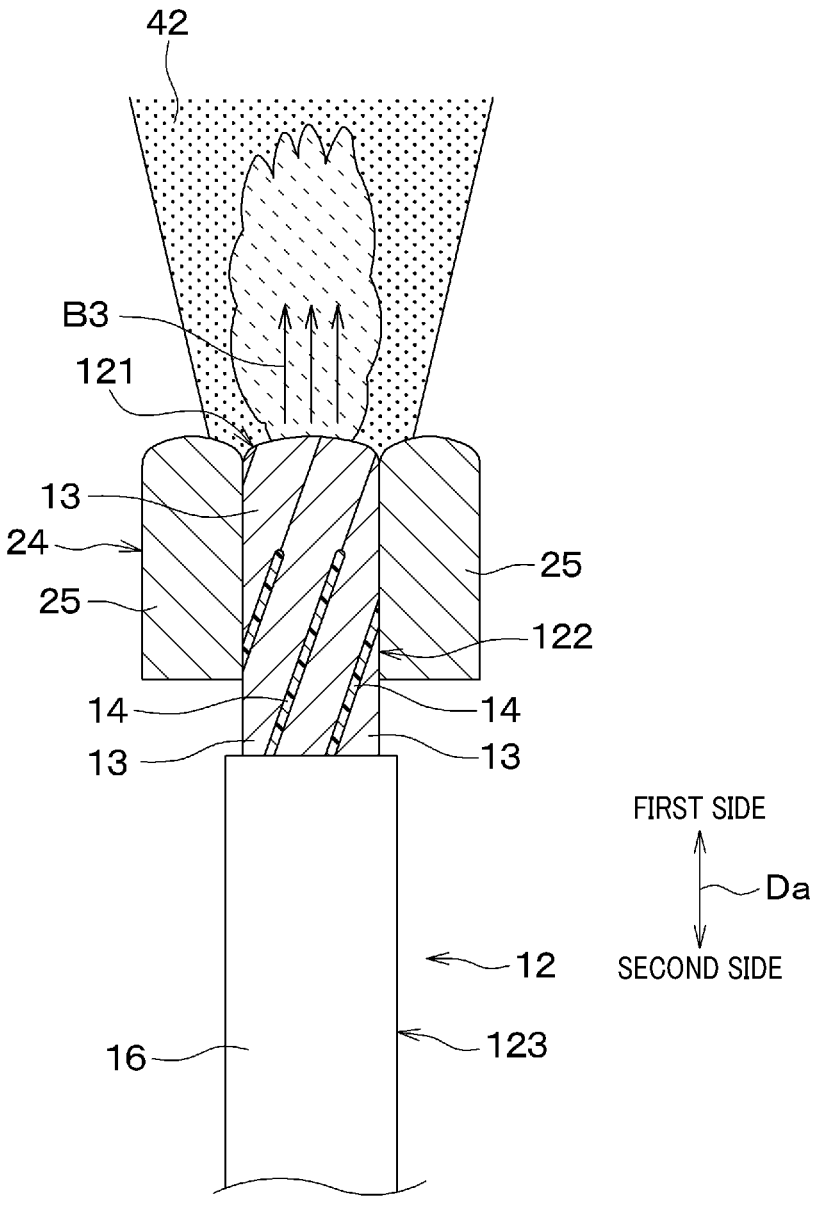
FIG. 10 is a cross sectional view equivalent to FIG. 8A which schematically illustrates emission of an energy beam between time t0 and time t1 in FIG. 9.

More specifically, the energy beam 42 starts to be emitted at time t0 in FIG. 9. The energy beam 42 is, as demonstrated in FIG. 10, emitted onto and around the head portion 121 from outside the first side of the head portion 121 of the twisted-wire conductor 12 which faces in the twisted-wire lengthwise direction Da. The energy density Ed of the energy beam 42 is kept at a first level E1 until time t1 in FIG. 9. The emission of the energy beam 42 from time t0 to time t1 removes the inter-wire insulating layers 14 from the head portion 121 of the twisted-wire conductor 12. Specifically, the inter-wire insulating layers 14 of the head portion 121 of the twisted-wire conductor 12 are, as indicated by arrows B3 in FIG. 10, thermally evaporated by heating of the head portion 121 of the twisted-wire conductor 12 arising from exposure to the energy beam 42.

A period of time between time t0 and time t1 in FIG. 9 for which the emission of the energy beam 42 is achieved and the first level E1 are predetermined experimentally in order to avoid adverse effects arising from thermal energy generated by the energy beam 42 which results in an undesirable increase in region melted by the energy beam 42 and also enable the inter-wire insulating layers 14 to be removed in a decreased period of time. In this embodiment, the beam emission time between time t0 and time t1 and the first level E1 are so determined as to hardly melt or not to entirely melt the metallic member connecting portion 25 and the head portion 121 of the twisted-wire conductor 12.

Subsequently, the energy density Ed of the energy beam 42 starts to be elevated from time t1 in FIG. 9 up to the second level E2 higher than the first level E1. The energy beam 42 whose energy density Ed has been elevated to the second level E2 continues to be emitted until time t2 in FIG. 9. At time t2, the emission of the energy beam 42 is completed. The head portion 121 of the twisted-wire conductor 12 and a portion of the metallic member connecting portion 25 which are melted by the energy beam 42 are re-solidified seamlessly after completion of emission of the energy beam 42.

The emission of the energy beam 42 between time t1 and time t2 causes the head portion 121 of the twisted-wire conductor 12 and a portion of the metallic member connecting portion 25 to be fused and welded together to complete the joined assembly 10 shown in FIG. 1.

The beam emission time between time t1 and time t2 and the second level E2 are predetermined experimentally in order to achieve a required degree of weld between the head portion 121 and the metallic member connecting portion 25 in a decreased period of time. Even if the inter-wire insulating layers 14 are slightly left in the head portion 121 at time t1, the removal of the inter-wire insulating layers 14 will be completed until time t2.

In the above way, the energy beam 42 continues to be emitted to the head portion 121 of the twisted-wire conductor 12, thereby resulting in a decrease in period of time consumed in the fourth step S04 in FIG. 5 depending upon the configuration of the joined assembly 10 as compared with the energy beam 42 is emitted intermittently to the head portion of the twisted-wire conductor 12.

Other arrangements are identical with those in the first embodiment which offer substantially the same beneficial advantages as those in the first embodiment.

OTHER EMBODIMENTS

Figure 3:
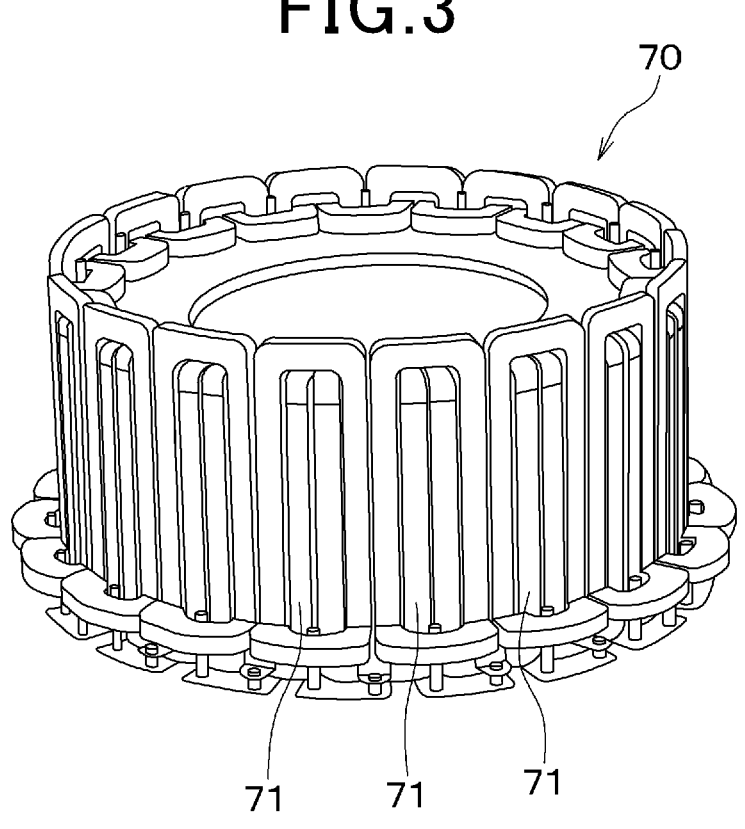
FIG. 3 is a perspective view which illustrates an electrical motor using a joined assembly in the first embodiment.
Figure 4:
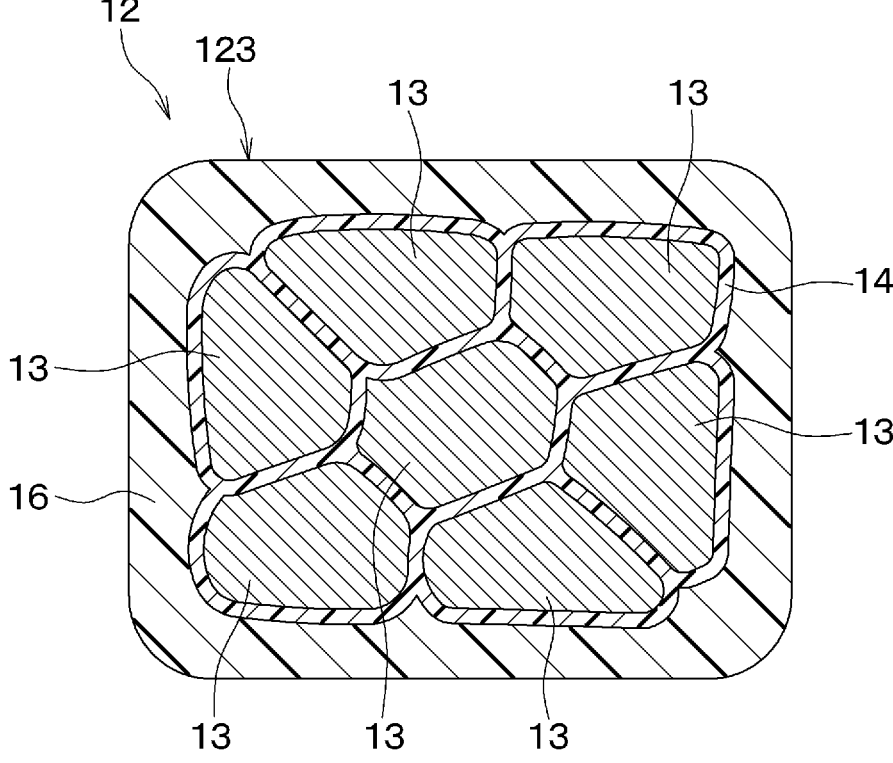
FIG. 4 is a cross sectional view, as taken along the line IV-IV extending perpendicular to a length of the joined assembly in FIG. 2, which schematically illustrates a twisted-wire conductor in the first embodiment.

1) In each of the above embodiments, the joined assembly is used in the electrical motor 70 shown in FIG. 3, but however, may alternatively be employed for other applications.

2) In each of the above embodiments, the twisted-wire conductor 12, as can be seen in FIG. 4, includes seven conductive wires 13, but however, may alternatively have, for example, two or eight conductive wires 13.

3) In each of the above embodiments, the conductive wires 13 of the twisted-wire conductor 12 are made from copper or copper alloy, but however, may alternatively be made from another metallic material, such as aluminum or aluminum alloy.

4) In each of the above embodiments, the metallic member 24 shown in FIG. 1 is made from copper or copper alloy, but however, may alternatively be made from another metallic material, such as aluminum or aluminum alloy.

5) In each of the above embodiments, the first insulating resin making each of the inter-wire insulating layers 14 shown in FIG. 4 is amide-imide (AI) resin, but however, may include PEI (polyetherimide) resin, PA (polyamide) resin, PI (polymide) resin, PAI (polyamide imide) resin, PES (polyethersulfone) resin, urethane resin, or PPS (polyphenylenesulfide) resin.

6) In each of the above embodiments, the inter-wire insulating layers 14 shown in FIG. 4 have an average thickness in a range of 3 μm to 30 μm, but the average thickness is preferably in a range of 3 μm to 15p.

7) In each of the above embodiments, the second insulating resin making the outer insulating layer 16 shown in FIG. 4 is PEEK resin, but may include PEI resin, PA resin, PI resin, PAI resin, PES resin, urethane resin, PPS resin, fluoroethylene resin, polycarbonate resin, silicon resin, epoxy resin, polyethylene naphthalate, or LCP (liquid crystal polymer) resin.

8) In each of the above embodiments, the first resin by which the first insulating resin by which the inter-wire insulating layers 14 is made and the second insulating resin by which the outer insulating layer 16 is made illustrated in FIG. 4 are different in material from each other, but however, they may be made from the same resinous material.

9) In each of the above embodiments, the metallic member 24 shown in FIG. 1 is designed as a busbar, but however, may alternatively be formed as another metallic member, such as an electrical terminal.

10) In each of the above embodiments, the outer insulating layer 16 is, as discussed in the second step S02 in FIG. 6, stripped from the head portion 121 and the head extension 122 of the twisted-wire conductor 12 using the laser beam 40, but however, may alternatively be mechanically removed or cut off using a cutting knife or chemically removed using solvent.

In the second step S02, the outer insulating layer 16 does not necessarily need to be removed completely from the head portion 121 and the head extension 122 of the twisted-wire conductor 12, but however, may be left to an extent that does not disturb the fusion-weld between the head portion 121 of the twisted-wire conductor 12 and the metallic member connecting portion 25. The outer insulating layer 16 is, like in the above embodiments, stripped both from the head portion 121 and from the head extension 122.

11) In the first embodiment, the energy beam 42 is, as can be seen in FIGS. 8A to 8C, emitted three times, but however, the number of times the energy beam 42 is emitted may be determined to be, for example, two or four or more as a function of the size or shape of each of the twisted-wire conductor 12 and the metallic member 24.

For instance, the number of emissions of the energy beam 42 may be two as long as the second emission of the energy beam 42 causes the head portion 121 of the twisted-wire conductor 12 and a portion of the metallic member connecting portion 25 to be completely mixed with each other, as illustrated in FIG. 8C, without the inter-wire insulating layers 14 remaining left in the head portion 121 of the twisted-wire conductor 12.

When even the third emission of the energy beam 42 results in, like in FIG. 8B, insufficient mixing of the head portion 121 of the twisted-wire conductor 12 and a portion of the metallic member connecting portion 25, the emission of the energy beam 42 may be achieved four or more times until the mixing of the head portion 121 with the portion of the metallic member connecting portion 25 reaches a required degree demonstrated in FIG. 8C.

12) In each of the above embodiments, the resin film or layer of the twisted-wire conductor 12 illustrated in FIG. 4 covers only the inter-wire insulating layers 14 and the outer insulating layer 16, but however, the twisted-wire conductor 12 may have intermediate layers each of which is disposed between a respective one of the inter-wire insulating layers 14 and the outer insulating layer 16 in addition to the inter-wire insulating layers 14 and the outer insulating layer 16. For instance, each of the intermediate layers is preferably made from resin material having a coefficient of linear expansion between those of the first insulating resin and the second insulating resin. The intermediate layers are removed from the head portion 121 of the twisted-wire conductor 12 upon exposure to the energy beam 42 together with the inter-wire insulating layers 14 in the fourth step S04 in FIG. 5.

13) In each of the above embodiments, the energy beam 42 used in the fourth step S04 in FIG. 5 is a laser beam whose wavelength is in a range of 400 nm to 600 nm, but however, another type of beam may be used. For instance, an electron beam may be used in the fourth step S04 depending upon the structure or quality of material of the twisted-wire conductor 12 and the metallic member 24.

14) In each of the above embodiments, the joined assembly 10, as can be seen in FIG. 2, includes the twisted-wire conductor 12 made of the plurality of conductive wires 13 which are twisted. The twisted-wire conductor 12 may alternatively be configured to have the plurality of conductive wires 13 which are bundled together in the form of a single conductor (i.e., a single wire bundle) without being twisted.

This disclosure is not limited to the above embodiments, but may be realized by various embodiments without departing from the purpose of the disclosure. For instance, technical features described in the embodiments which correspond to those referred to in the summary of the invention may be replaced with each other or combined in different ways in order to solve at least a portion of the problems or ensure at least a portion of the beneficial effects. The technical features may be omitted unless otherwise stated as being essential in in principle.

The component parts described in the above embodiments are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principle. Similarly, when the shape of, the orientation of, or the positional relation among the component parts is referred to in the above discussion, this disclosure is not limited to it unless otherwise specified or clearly essential in principle.

What is claimed is:

1. A production method for a joined assembly including a wire bundle and a metallic member, comprising:

using a bundle of a plurality of conductive wires as the wire bundle, the conductive wires being isolated from each other through inter-wire insulating layers made from insulating resin;

holding a head portion of the wire bundle in contact with a metallic member connecting portion of the metallic member, the head portion being arranged on a first side of the wire bundle in a lengthwise direction of the wire bundle, the head extension extending from the head portion to a second side of the wire bundle away from the first side in the lengthwise direction, the conductive wires being kept adhered to each other through the inter-wire insulating layer within the head extension, and making an end-to-end joint which is created by fusion-joining the conductive wires within the head portion of the wire bundle to a portion of the metallic member connecting portion after the head extension is retained to the metallic member connecting portion, wherein the end-to-end joint is created by emitting an energy beam to fuse and weld the head portion of the wire bundle to the portion of the metallic member connecting portion and also to remove the inter-wire insulating layers from the head portion.

2. The production method as set forth in claim 1, wherein the metallic member is made from one of copper and copper alloy, the conductive wires are made from one of copper and copper alloy, the end-to-end joint is produced by using a laser beam whose wavelength is 400 nm to 600 nm in a form of the energy beam.

3. The production method as set forth in claim 1, wherein the inter-wire insulating layers have an average thickness of 3 to 30 μm.

4. The production method as set forth in claim 1, wherein emission of the energy beam is performed multiple times.

5. The production method as set forth in claim 1, wherein the end-to-end joint is created by steps of emitting the energy beam whose energy density is set to a first level to remove the inter-wire insulating layers from the head portion and then emitting the energy beam whose energy density is changed to a second level which is higher than the first level to fusion-join the head portion of the wire bundle to the portion of the metallic member connecting portion.

6. The production method as set forth claim 1, wherein the wire bundle has the conductive wires twisted in a form of a twisted-wire conductor, and holding the head portion of the wire bundle in contact with the metallic member connecting portion of the metallic member is achieved by retaining the head extension in contact with the metallic member connecting portion with the conductive wires being kept twisted within the head extension.

* * * * *